Oct. 25, 1960 W. W. PEARCE 2,957,447
INDICATOR KNOB
Filed Nov. 24, 1958

WOODROW W. PEARCE
INVENTOR.
HERZIG & JESSUP,
BY ATTORNEYS.

United States Patent Office 2,957,447
Patented Oct. 25, 1960

2,957,447

INDICATOR KNOB

Woodrow Wilson Pearce, 911 Air Way, Glendale, Calif.

Filed Nov. 24, 1958, Ser. No. 775,852

1 Claim. (Cl. 116—124)

This invention relates to illuminated indicia and more particularly as exemplified herein, a control knob having an illuminated index marker. Control knobs of the type exemplified herein are rotatable knobs often utilized for example, on aircraft control panels and in similar environments. The index marker on the knob is adapted for alignment with reference marks on a control panel with which the knob is associated.

In aircraft applications for example it is particularly desirable that the index line or marker be visible both during the day time and at night and yet that any illumination utilized for purposes of illuminating the index line or marker be insufficient to otherwise illuminate the cockpit of the aircraft and to thereby interfere with the pilot's vision.

It has been known in the prior art to construct both indicator dials and knobs of light conducting materials, such as plastic materials provided with illuminated reference indicia or index markers. According to the known practices a knob, for example, may be made of transparent or translucent material and coated with a transluscent reflecting material which is preferably a white material. Superimposed on the translucent coating is another layer or coating of opaque material which may for example, be black. The index marker or line is then formed by engraving through the black coating leaving the white visible. Thus light is transmitted through the material of the knob and through the translucent coating along the engraving to provide the illuminated index marker. The deficiency present in this known practice is that in a short time, after a limited amount of use of the knob its surface becomes scratched and marred around and adjacent the engraving with the result that the engraved index marker is indistinguishing from the adjacent areas. The engraving, that is the engraved index line or marker, is subject to scratching itself with the result that an irregular pattern of light is formed.

The herein invention provides an improved way of providing the illuminated index marker which positively insures the permanency of its distinguishability and which provides a more desirable illumination on the instrument panel.

The herein invention does not utilize engraving but instead provides for the formation of a groove in the surface of the knob, by way of example, and a translucent nsert strip is placed in the groove and may be bonded therein. Preferably an edge of the insert, which is in the form of a strip for forming an index marker protrudes above surfaces adjacent to the groove as to form a ridge or simulated embossment. The exposed surfaces of the knob are coated with opaque material or coating with the exception of the outer edge surface of the insert strip. The insert strip is preferably of a white translucent material so that in the day time it presents a contrasting color as compared to the surrounding surfaces of the knob. When illumination is provided through the material of the knob the light is transmitted or conducted through the translucent insert so as to provide the illuminated index marker. As can be seen therefore, the index line or marker so formed is not subject to the deficiencies described above and provides a permanent index line, the material of the insert being one having non-scratch qualities. It therefore assures a permanent regular pattern of light. In forming and producing the knob, the entire knob including the insert may be coated with a dark opaque coating and then this coating may be removed along the outer edge surface of the insert by engraving as will be described more in detail here and after.

The primary object of the invention is to provide improved illuminated indicia or indicating means.

A further object of the invention is to provide an improvement in indicator knobs having an illuminated index line or marker wherein the index is made permanently distinguishable by being formed by a translucent insert positioned in a groove in the indicator.

A further object of the invention is to improve or provide an improvement in indicator knobs having an illuminated index as in the foregoing object wherein the entire outer surfaces of the knob have a first coating of a preferably white translucent material with a dark opaque coating over the translucent coating with the white coating exposed only on the outer edge surface of the insert.

A further object of the invention is to provide an improved method of forming illuminated indications by way of forming an indentation in a light transmitting body, inserting in the indentation an insert conforming in shape to the indentation, and formed of translucent material with the surfaces of the body other than those occupied by the insert covered with an opaque material or coating.

Further objects and additional advantages and novel aspects of the invention will become apparent from the following detailed description and annex drawings wherein.

Figure 1:
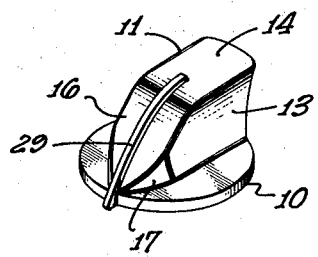
Figure 1 is a perspective view of the improved knob of the invention.
Figure 2:
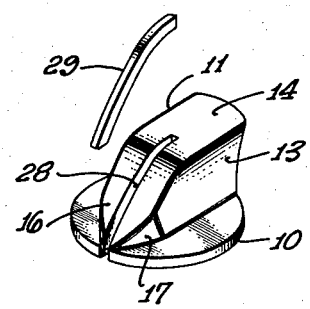
Figure 2 is a perspective view similar to that of Figure 1 with the translucent insert displaced from its groove or slot.

Referring now to the various figures of the drawing, Figure 1 shows the invention as exemplified in a knob having the particular shape shown in the figure. Preferably the body of the knob is molded or formed from a clear transparent acrylic plastic. The bottom part of the knob is of disc shape as shown at 10. Extending across the disc is a bar or handle portion having a shape as shown at 11. Handle 11 has concave side walls as may be seen at 13 in Figure 2 and a flat top as shown at 14. One side of the handle member or portion slants downwardly having a slanting face as shown at 16 and the portion between this surface and the top surface is smoothly rounded as shown. The front slanting portion of the handle 11 tapers at the front as shown at 17. The handle or body 11 is hollow at the back and the two sides form wings as may be seen at 18 which extend downwardly from the flat topped rear portion indicated at 14.

The body of the knob has a bore arranged centrally of the disc portion 10 as shown at 21, the upper end of which has a slight taper as shown. Fitting in the bore 21, is a cylindrical bushing as shown at 22 having a similar taper at its upper end and having a bore 23 adapted to be secured on the shaft of a control instrumentality to be adjusted by the knob. The bushing 22 may be made of brass for example and the body of the knob may be molded around it. The exterior surfaces of the bushing 22 may be knurled or stippled in order that it will be securely held in the molded body of the knob.

In the back wall of the body of the knob there is a transverse bore at 25 the axis of which coincides with a screw threaded bore in a side wall of the bushing 22 and received in this bore is a set screw 26 adapted for securing the knob to a shaft. The bushing 22 may have a flat or flat side on the inside of the bore corresponding in position to the inner end of set screw 26 if desired.

Figure 3:
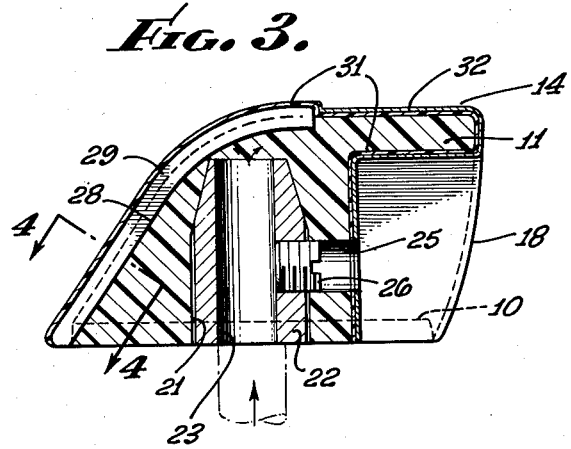
Figure 3 is a cross sectional view in elevation of the knob of the invention.

The upper or handle portion of the knob has a shallow relatively narrow groove extending down along the slanting surface 16 as indicated at 28, the groove lying in a plane including the central axis of the knob. Numeral 29 designates an insert member shaped to fit into the groove or slot 28 as may be seen in Fig. 3 with edge of the insert member protruding or extending above the adjacent surfaces of the groove in the manner of an embossment. The insert 29 is preferably formed of a translucent white thermoplastic acrylic material.

Figure 4:
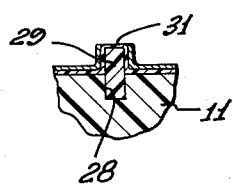
Figure 4 is a sectional view taken along the line 4—4 of Figure 3.

The outer exposed surfaces of the knob are coated with an undercoat of white translucent material as designated by the numeral 31. The white coating 31, may be a polyvinyl or vinyl resin and forms a light reflecting surface. That is, light admitted to the body of the knob at the bottom thereof is reflected back into the body of the knob where ever such light strikes the coating 31. The coating 31 coats the outer edge surface of the insert 29 as well, as may be seen in Fig. 4.

Figure 5:
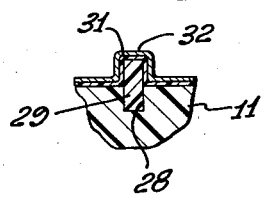
Figure 5 is a view similar to that of Figure 4 with the opaque coating on the outer edge surface of the insert.

A second coating as designated by the numeral 32 is applied over the undercoating and this coating is opaque and by way of example may be gray in color. The coating 32 may be any suitable opaque material, the coating 31, of course, being translucent. These coatings may be applied in the form of paints which are brushed, sprayed, or otherwise applied to the body of the knob. As shown in Fig. 5 the opaque coating 32 is shown covering the outer edge surface of the insert 29. The coating 32 is removed from the outer edge of the insert 29 by engraving without removing the translucent coating 31 with the result appearing as in Fig. 4. That is, summarizing the method, the body of the knob is molded onto the bushing 22; the groove may be formed at the same time or provided after molding of the knob onto the central bushing; the insert 29 is then placed in the groove and it may be cemented or bonded therein; the light conductive coating 31 is then applied as described; the opaque coating 32 is then applied over the undercoating and this coating is removed by engraving from the outer edge surface of the insert 29 with the inner coat remaining.

In use, the knob of the invention may be mounted on a shaft over an edge lighted, light conducting panel as is already known in the art. Light transmitted upwardly through the body of the knob is reflected inwardly by the undercoating 31. The insert 29 being translucent the light is conducted through it so that a clearly visible index line or marker is formed on the slanting surface 16 of the knob. The material of the insert has non-scratching qualities and it therefore provides a permanent readily distinguishable index marker.

From the foregoing those skilled in the art will observe that the invention provides a way of producing illuminated indicia or indications wherein the illumination is through a permanent translucent insert formed or placed in an indentation or groove in a light transmitting body which otherwise has opaque coating on the outside thereof. The material of the insert is not subject to scratching and provides a permanent regular pattern of light in the form of the illuminated index line. The invention is effective for its purpose; and it is easy and economical to fabricate and assemble.

The foregoing disclosure is representative of a preferred form of the invention and is to be interpreted in an illustrative rather than a limiting sense. Various alternatives and modifications may occur to and be adopted by those skilled in the art without departing from the realm and scope of the invention which is to be determined in accordance with the claim appended hereto.

I claim:

An indicator knob, comprising a body of transparent material having means for attaching the body to a shaft to be rotated, said body having a groove of substantial depth extending inwardly from the outer surface thereof, lying in a plane including the axis of the knob and extending to the periphery thereof, an insert strip of translucent material positioned and fitting snugly within and secured in said groove, filling the groove and projecting outwardly therefrom to form an index line for the knob, and said knob having a translucent coating on its exposed surfaces and an opaque coating over said translucent coating with the exception of the outer edge surface of said insert.

References Cited in the file of this patent

UNITED STATES PATENTS

| | | |
|---|---|---|
| 2,278,520 | Klein | Apr. 7, 1942 |
| 2,420,985 | Simpson | May 20, 1947 |
| 2,699,141 | Gaguski | Jan. 11, 1955 |

FOREIGN PATENTS

| | | |
|---|---|---|
| 562,231 | Canada | Aug. 26, 1958 |